Nov. 22, 1966     H. FOELSCH     3,286,870
MEANS AND METHOD OF FLUID TANK CONSTRUCTION
Filed March 13, 1964
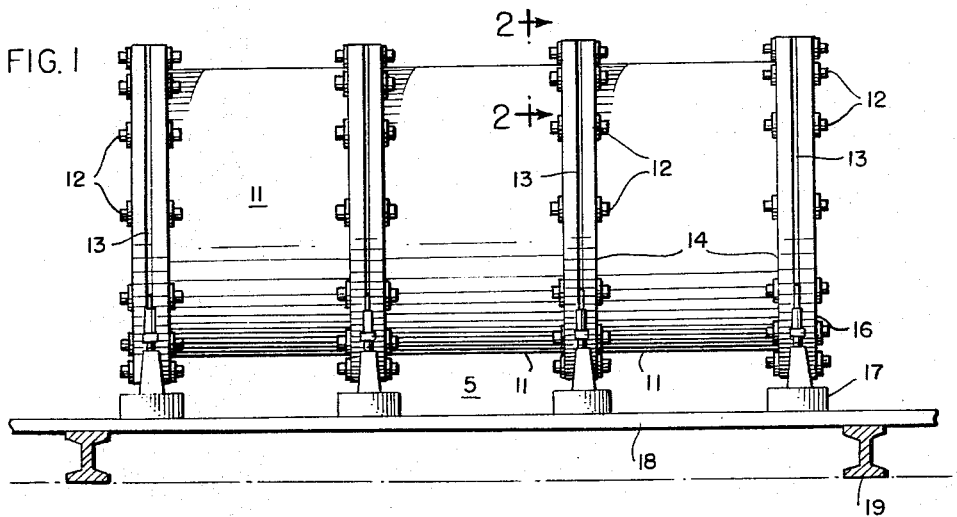
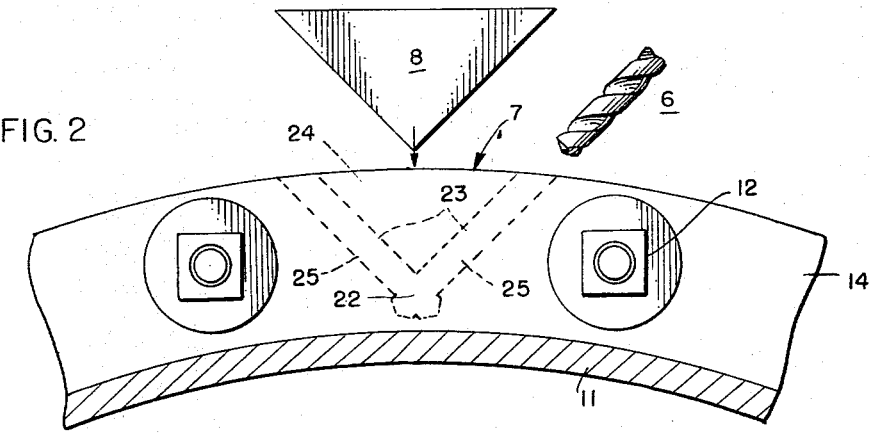
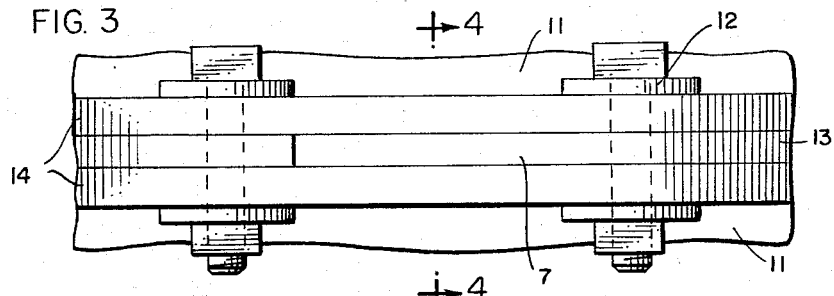
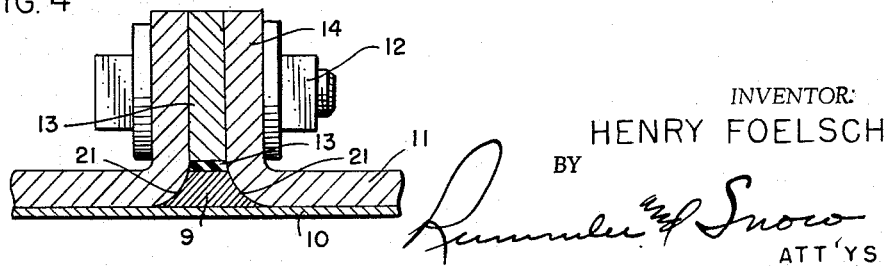
INVENTOR:
HENRY FOELSCH
BY
ATT'YS United States Patent Office 3,286,870
Patented Nov. 22, 1966

3,286,870
MEANS AND METHOD OF FLUID TANK CONSTRUCTION
Henry Foelsch, Elmhurst, Ill., assignor to Lithcote Corporation, Melrose Park, Ill., a corporation of Delaware
Filed Mar. 13, 1964, Ser. No. 351,805
10 Claims. (Cl. 220—5)

This invention relates to the structuring of massive, fluid sectional tanks.

In the production and/or processing of beer very large, sectional tanks are used. These tanks often measure 7 to 10 feet in diameter and many feet in length. The annular sections of approximately 2′ to 5′ in width with perimetrical flanges are secured together, with interposed rubber rings, by bolt-and-nut fasteners spaced apart circumferentially on approximately 1⅝″ centers.

When such tanks currently are installed a ring-shaped plate is set to cover each of these junctions, which plate is welded along its opposite edges to the inner walls of the respective annular sections. Sometimes a metal ring shaped plug is inserted in these openings and welded to the interior walls of the tank.

The problem that later arises, with these massive tanks, results from the all-too-frequent sagging of the flooring supporting on which the tanks have been installed. Obviously, when such sagging of the tank support occurs the tank sections are subject to some axial disalignment. The resulting stress frequently causes the fracturing of the welds of these interior ring-shaped plates to the tank sections causing bacteria to attack the brew and spoiling it. The further problem then arises of tank repair as an alternative to the installing of a new tank. To date no effective installation or repair procedure has been developed to prevent or remedy this condition.

The main objects of this invention, therefore, are; to provide an improved means and method for structuring massive, sectionalized tanks for fluids secured together to form a unitary structure with a smooth and impervious interior lining; to provide an improved and practical means and method of this kind for reconditioning sectionalized tanks that have been subject to such strains as to cause their axial disalignment to the point of fracturing the bonds between the sections as well as the tank lining and resulting in fluid leaks; to provide an improved means and method of this kind which will ensure such an effective union of the tank sections as will prevent the future axial disalignment resulting from sagging supports; and to provide an improved means and method of this kind of such a practical nature as to make its use very economical and facile for effecting a long-enduring structure.

In the adaptation shown in the accompanying drawing;
FIGURE 1 is a side elevation of a three-section massive tank of the general type which may be structured in accordance with this invention;
FIG. 2 is a much-enlarged, fragmentary view illustrating how segments of the gasket rings are removed for the subsequent replacement thereof by comparable metal segments;
FIG. 3 is a plan view of what is shown in FIG. 2; and
FIG. 4 is a cross-sectional view taken on the plane of the line 4—4 of FIG. 3.

The essential concept of this invention, for the initial structuring and/or the subsequent reconditioning of massive, sectionalized tanks for fluids involves the removal of a series of segments from gasket rings between the fasteners which secure a battery of flanged, annular sections in axial relationship, replacing the gasket segments with substantially identically-shaped metal segments bonded to the opposed faces of the annular-section flanges, and, finally, if desired effecting a smooth, imperviously-lined interior surface of the tank.

A means and method embodying the foregoing concept, involving a tank 5, provides for the use of a cutting instrument 6, for removing gasket segments 7, replaceable metal segments 8, the leveling off grout fills 9 and if desired applying a lining 10.

The tank 5, as shown in FIG. 1, only comprises three annular sections 11 secured in axial alignment by fasteners 12 with gasket rings 13 interposed between the opposed section flanges 14. It should be understood that in installations the tank comprises many sections. As indicated in FIG. 4, the fasteners 12 are bolt-and-nut type. The gasket rings 13 are of a radial width and so arranged that the exterior perimeters are substantially flush with the exterior perimeters of the flanges 14 but leaves a gap-space between the inner perimeter of the gasket rings 13 and the arcuate areas 21 of the flanges 14.

As hereinbefore noted, these annual sections 11 generally are of quite large diameter, sometimes 7 to 12 feet. The 3-section tank illustration in FIG. 5, is intended to be symbolic of the general run of this kind of tank often comprising many sections. Such a tank has its ends closed by plates or heads 16 and is usually supported on jacks 17 resting on room floor 18 which is here shown as supported on I-beams 19, to support the tank. The jacks are positioned at each joint and on opposite sides. (The drawings illustrate the jacks on one side only.)

The cutting instrument 6, as indicated in FIG. 2, is a conventional twist drill. Such a drill would be of a diameter substantially equal to the thickness of the gasket rings 13. Obviously, some other type of cutting instrument might be used to effect the removal of the gasket-ring segments 7 in the manner presently to be described.

The procedure for carrying out the herein disclosed invention as illustrated is as follows:

The cutting instrument 6 is pressured into each gasket ring 13, between the abutting flanges 14 of each of the annular sections 11. Such drilling is done at an angle of about 40–50 degrees to and from both sides of the radius extending outwardly medially of each adjacent pair of fasteners 12, as indicated by dash and dot line 22 of FIG. 2. Preferably, these two, almost right-angle holes 23 meet short of the inner perimeter of the gasket ring 13. The remaining triangular portion 24, of the gasket ring 13, between the dotted lines 25 is removed. Such portion 24 plus the portions extracted by the drilled holes 23, constitute the gasket section 7 which, between the dotted lines 25 constitute the "segment" which is removed from the respective gasket ring 13. This operation is continued until such segments 7 are removed from each gasket ring 13 and between each adjacent pair of fasteners 12. When the "segments" are removed the inner faces of the opposed flanges 14 are free of the gasket 13.

Thereupon, the preformed metal segments 8, dimensioned for close fitting into the cavities formed by the removed gasket segments 7, are set into the cavities of each gasket ring 13. This may be done as the cavities in each gasket ring are completed or it may be deferred until all of the segment rings 13 for a tank 5 have had the segments 7 removed.

In either procedure, before the metal segments 8 are set to replace the removed gasket segments 7, these metal segments 8 are "buttered"—as it is termed in the industry —with an appropriate, quick-setting epoxy resin. So buttered, each metal segment 8 is pressed into each of the cavities formed by the removed gasket-ring segment 7. If found necessary, each metal segment 8 may be further pressured into position by the use of force, such as striking it with a mallet, so as to ensure the most complete contact of the sides of the metal segments with the opposed faces of the embracing gasket rings 13. The assembly thus completed, is allowed to stand for such a period of time as may be required to ensure the complete setting of the epoxy resin adhesive, to effect the bonding of the metal segment to the section flanges 14.

Next, all space gaps between the inner perimeters of the gasket rings 13 and the arcuate areas 21 of each pair of abutting flanges 14 are filled with a suitable grout material 9 of a kind well known in the industry. Applicant prefers to employ a grout made up of an epoxy resin. This grout insert 9 is leveled off with the interior wall of the assembled annular sections 11 to form a continuous, impervious and smooth surface throughout the interior of the tank 5.

Finally, if desired, the coating 10 of suitable chemical paint is applied, in any suitable manner, over the entire wall of the tank 5.

It should now be apparent that the gasket 13 may be preformed with suitable triangular shaped cutouts during original production and used in sectional tank original installation, whereby the buttered metal segments 8 may also be installed at that time. Thereby prolonging the useful life of sectional tanks.

It should also now be obvious that although a triangular shaped cutout and metal segment has been illustrated and described other shaped cutouts and comparably shaped segments may likewise be employed such as square, rectangular, semi-circular, half oval, etc.

It will be understood that details of the construction shown may be altered or omitted without departing from the spirit of the invention as defined by the following claims.

I claim:

1. A massive, fluid tank comprising, a series of axially-disposed, flanged annular-sections, and flanged end closure sections, gasket rings interposed between the flanges, a series of circularly-spaced fasteners clamping the sections into a unitary tank structure, a series of segments removed from each of said gaskets, and metal segments substantially identical with the gasket segments replaced for the gasket segments and bonded to the opposed faces of the section flanges.

2. A massive, fluid tank as set forth in claim 1 wherein the segments are triangular-shaped with the respective bases disposed substantially in the outer periphery of the gasket with the apex of each segment extending inwardly toward the center of the tank.

3. A massive, fluid tank as set forth in claim 2 wherein the gasket segments are removed from between adjacent fasteners.

4. A massive, fluid tank as set forth in claim 1 wherein any space gap between the inner periphery of each gasket ring is filled with grout and leveled off with the inner wall of the tank to form a smooth impervious surface.

5. The method of securing in fastener-fixed, axial relationship gasket-ring-spaced, flanged annular-sections of a massive fluid tank, which involves, first, the removal of a series of segments from the gaskets and, subsequently, replacing the gasket segments with substantially-identical shaped metal segments bonded to the opposed faces of the annular-section flanges.

6. The method as set forth in claim 5 wherein the metal segments are coated with a fluid adhesive before replacing the gasket segments.

7. The method as set forth in claim 5 wherein the gasket segments are removed by pressuring a cutting instrument into the gasket from a periphery thereof at oppositely-inclined angles to intersect a radius intermediate each adjacent pair of fasteners.

8. The method as set forth in claim 5 wherein the gasket segments are removed from the exterior periphery of the gasket.

9. The method of securing in fastener-fixed, axial relationship, gasket-ring-spaced, flanged annular sections and heads of a massive fluid tank, which involves, first, the removal of a series of segments from the gasket rings, next replacing the gasket segments with substantially-identical metal segments, then bonding the metal segments to the opposed faces of annular-section and head flanges, and, subsequently, filling with grout any space gaps between the inner periphery of each gasket ring and the interior wall of the tank and leveling off the filled-in grout with the face of the tank wall to form a smooth impervious surface.

10. The method of repairing a massive, fluid tank structured from a series of axially-disposed, fastener-fixed, flanged annular sections and heads spaced apart and sealed by gasket rings, which method consists, first, in successively pressuring a cutting instrument into the gasket rings to remove a series of circularly-spaced segments therefrom, next, replacing the removed gasket-ring segments with substantially identical metal segments each coated with a bonding adhesive, subsequently, filling in with grout any space gaps between the interior periphery of each gasket ring and the interior wall of the tank, and finally leveling off filled-in grout with the interior face of the tank wall to form a smooth, impervious surface.

References Cited by the Examiner

UNITED STATES PATENTS

| 1,231,290 | 6/1917 | Otte. | |
| 1,467,064 | 9/1923 | Oleson. | |
| 1,604,855 | 10/1926 | Skitt | 220—81 X |
| 2,065,480 | 12/1936 | Soper. | |
| 2,291,132 | 7/1942 | Ashley | 220—81 |
| 2,590,803 | 3/1952 | Unger | 220—81 X |

LOUIS G. MANCENE, *Primary Examiner.*